(12) United States Patent
Hyung et al.

(10) Patent No.: US 8,168,325 B2
(45) Date of Patent: May 1, 2012

(54) LITHIUM BASED ELECTROCHEMICAL CELL SYSTEMS HAVING A DEGASSING AGENT

(75) Inventors: Yoo-Eup Hyung, Naperville, IL (US);
Donald R. Vissers, Naperville, IL (US);
Khalil Amine, Downers Grove, IL (US)

(73) Assignee: UChicago Argonne, LLC, Chicago, IL (US)

( * ) Notice: Subject to any disclaimer, the term of this patent is extended or adjusted under 35 U.S.C. 154(b) by 1007 days.

(21) Appl. No.: 11/943,462

(22) Filed: Nov. 20, 2007

(65) Prior Publication Data

US 2008/0070121 A1    Mar. 20, 2008

Related U.S. Application Data

(62) Division of application No. 10/738,400, filed on Dec. 17, 2003, now abandoned.

(60) Provisional application No. 60/434,214, filed on Dec. 17, 2002.

(51) Int. Cl.
*H01M 6/04* (2006.01)
*H01M 4/58* (2010.01)

(52) U.S. Cl. ........ 429/188; 429/300; 429/306; 429/326; 429/231.1; 429/231.95

(58) Field of Classification Search ............... 429/326, 429/331, 332, 52, 9, 231.95, 231.6, 223, 429/224, 231.1, 231.4, 149, 221, 231.5, 231.8, 429/300, 306, 322, 188
See application file for complete search history.

(56) References Cited

U.S. PATENT DOCUMENTS

| | | | |
|---|---|---|---|
| 3,567,601 A | 3/1971 | Lucas et al. | |
| 4,489,145 A | 12/1984 | Abraham et al. | |
| 5,567,527 A * | 10/1996 | Webster et al. | 428/412 |
| 5,654,114 A | 8/1997 | Kubota et al. | |
| 5,962,168 A | 10/1999 | Denton, III et al. | |
| 5,993,993 A * | 11/1999 | Hall | 429/163 |
| 6,245,461 B1 | 6/2001 | Smith et al. | |
| 6,507,378 B1 | 1/2003 | Yano et al. | |
| 6,942,949 B2 | 9/2005 | Besenhard et al. | |
| 2002/0160271 A1 * | 10/2002 | Frech et al. | 429/314 |
| 2003/0157413 A1 | 8/2003 | Chen et al. | |
| 2004/0001302 A1 | 1/2004 | Sato et al. | |
| 2004/0265701 A1 * | 12/2004 | Tsukamoto et al. | 429/338 |

FOREIGN PATENT DOCUMENTS

| | | | |
|---|---|---|---|
| JP | 10-040928 | * | 2/1998 |
| JP | 10-270082 | * | 10/1998 |

* cited by examiner

*Primary Examiner* — Raymond Alejandro
(74) *Attorney, Agent, or Firm* — Foley & Lardner LLP

(57) ABSTRACT

A lithium based electrochemical cell system includes a positive electrode; a negative electrode; an electrolyte; and a degassing agent.

18 Claims, 3 Drawing Sheets

LITHIUM BASED ELECTROCHEMICAL CELL SYSTEMS HAVING A DEGASSING AGENT

This application is a Divisional Application of U.S. patent application Ser. No. 10/738,400, filed Dec. 17, 2003, and now abandoned, which in turn claims the benefit of U.S. Provisional Patent Application No. 60/434,214, filed on Dec. 17, 2002, both of which are incorporated herein by reference.

This invention was made with government support under Contract No. W-31-109-ENG-38 awarded to the Department of Energy. The Government has certain rights in this invention.

BACKGROUND OF THE INVENTION

Gas generation in both Li-ion and lithium-metal based primary and secondary electrochemical cells may become a serious problem both during normal cell operation at room temperature and, more especially, at elevated temperatures. The consequence of gas build up includes cell can expansion and subsequent can rupture, leading to cell and or battery failure. For example, the gassing problem has been observed to be extremely serious in large electric vehicle type cell systems and in pouch type cell systems where rupture of the cell containment leads to serious safety problems. The gassing problem is also very serious in lithium-metal based primary cells using liquid and/or solid electrolytes in vivo applications such as for heart pacemakers and similar devices.

Because both the negative and positive electrodes in the charged states of nearly all lithium based electrochemical cell systems are thermodynamically unstable in respect to the electrolyte, it is especially important that electrolyte additives be developed to stabilize the electrodes by decreasing the kinetics of the respective electrode reactions and thereby reducing the gas generation.

SUMMARY OF THE INVENTION

This invention is directed toward the development of both primary and secondary Li-ion and lithium-metal based electrochemical cell systems in which the suppression of gas generation is achieved through the addition of an additive or additives to the electrolyte system of the respective cell, or to the cell whether it be a liquid, a solid- or plastized polymer electrolyte system. The gas suppression additives in this patent application are primarily based on unsaturated hydrocarbons and nitrogen containing organic materials.

DETAILED DESCRIPTION OF THE PREFERRED EMBODIMENTS

By use of appropriate additive or additives, the primary and secondary electrochemical Li-ion cells of this invention have minimal gassing and possess high specific energy and power, as well as excellent calendar and cycle life across a broad temperature range. The additives that are capable of ameliorating gas generation in the lithium based electrochemical cells include at least the following class of organic compounds, which will be described in more detail hereinafter: (a) $CH_2=R_1=CH_2$, where $R_1$ is an aliphatic carbon chain of 1 to 7 carbons, either linear or branched (b) $CH=R_1=CH$, (c) $CH_2=R_1$, (d) $CH=R_1$, (e) $R_2-CH=R_1=CH_2$, where $R_2$ is an aromatic (toluene or benzene), a cyclic hydrocarbon, (f) $R_2-C=R_1=CH$, (g) $R_2-CH=R_1$, (h) $R_2-C=R_1$, (i) styrene carbonate, (j) aromatic carbonates, (k) vinyl pyrrole, (l) vinyl piperazine, (m) vinyl piperidine, (n) vinyl pyridine, (o) triphenyl phosphate and blends thereof. These blends may involve other additives such as vinyl ethylene carbonate to protect against exfoliation in propylene carbonate based Li-ion electrolyte systems.

The present invention provides electrochemical lithium-based primary and secondary cells with excellent calendar life across a broad temperature, and includes cells with liquid and solid- and plastized polymer electrolytes.

Figure 1:
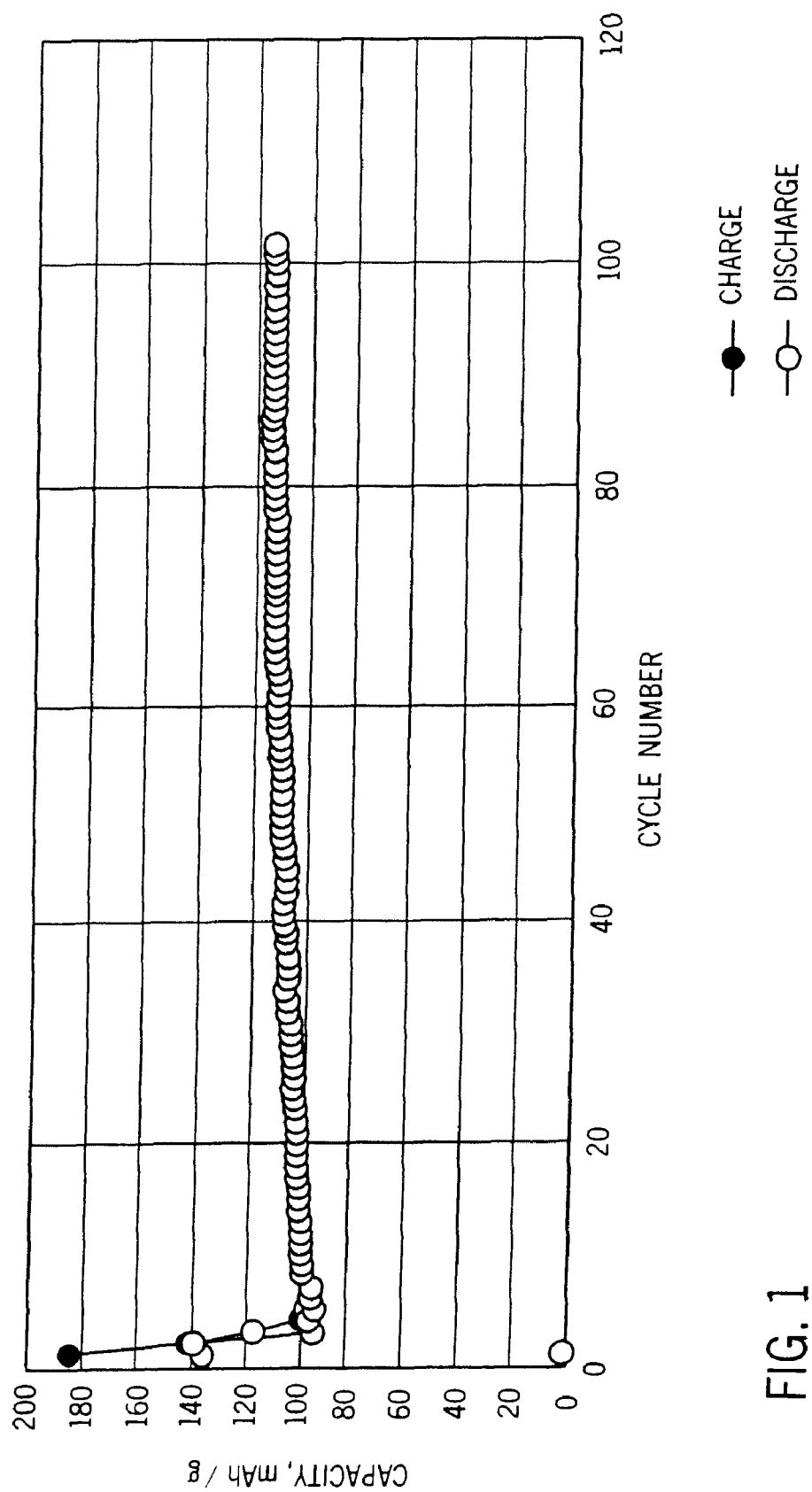
FIG. 1 shows cycle life characteristics of a Li-ion cell (ANL-1) containing 1.0 wt % 2,3 dimethyl-1,3 butadiene with the 1 M $LiPF_6$ dissolved in ethylene carbonate (30%) and ethyl-methyl carbonate (70%)

FIG. 1 shows the improved cycle life characteristics of a Li-ion cell (ANL-1) containing 1.0 wt % 2,3 dimethyl-1,3 butadiene (DMB). The cell utilized a crystalline graphite anode, a $LiNi_{0.8}CO_{0.2}O_2$ cathode and an electrolyte containing 1 M $LiPF_6$ dissolved in a blend of ethylene carbonate and ethyl-methyl carbonate.

Figure 2:
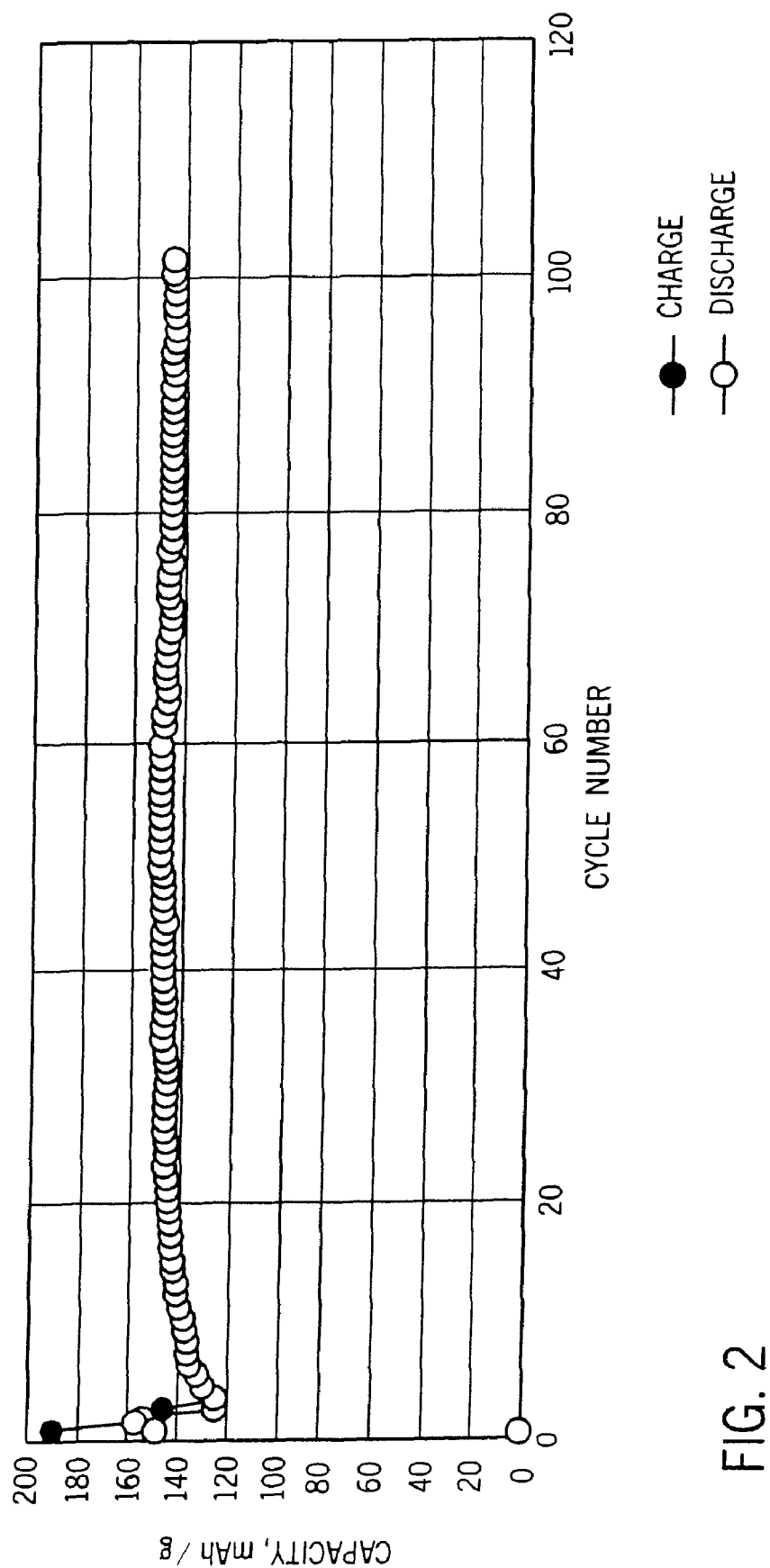
FIG. 2 shows cycle life characteristics of a Li-ion cell (ANL-2) containing 2.0 wt % VEC and 1.0 wt % 2,3 dimethyl-1,3 butadiene with the 1 M LiPF6 dissolved in ethylene carbonate (20%), propylene carbonate (20%), and diethyl carbonate (60%)

FIG. 2 shows the improved cycle life characteristics of a Li-ion cell (ANL-2) containing 2.0 wt % VEC and 1.0 wt % 2,3 dimethyl-1,3 butadiene with the 1 M $LiPF_6$ dissolved in blend of ethylene carbonate, propylene carbonate, and dimethyl carbonate. The cell utilized the same cathode and anode as cell (ANL-1).

Figure 3:
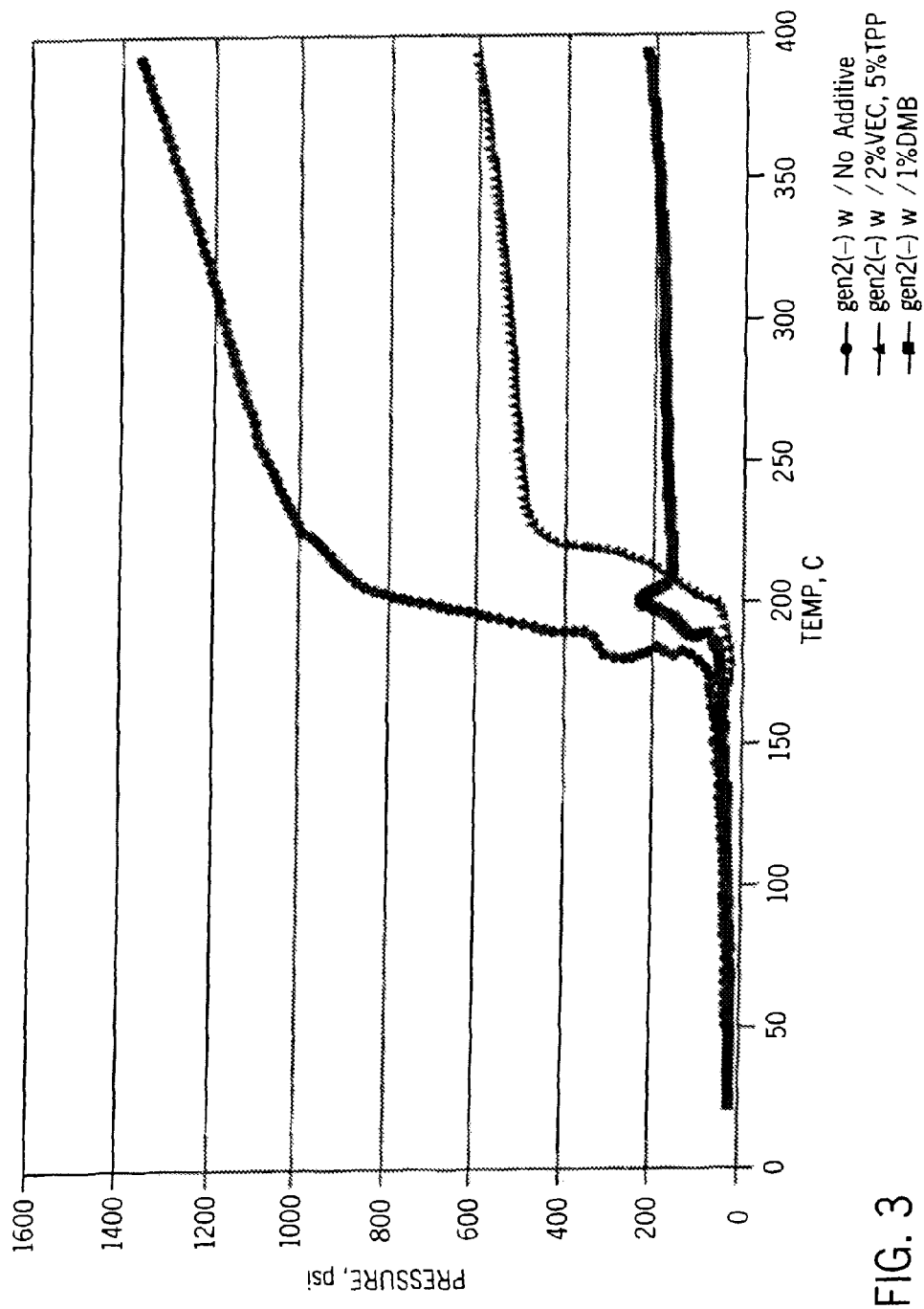
FIG. 3 shows changes of gas pressure change during ARC measurements of negative electrodes and electrolytes from Li-ion (ANL-1) cells with additives and a reference cell negative electrode and electrolyte from a (ANL-1) cell, but without additives.

FIG. 3 shows the gas pressures developed by studies of the respective negative electrodes with electrolyte from cell (ANL-1) and compares the pressures developed by the negative electrodes and electrolyte from a similar cell that did not contain the 2,3 dimethyl-1,3 butadiene. The results of these studies indicate the additives significantly reduce the degree of gassing in the negative electrodes of cell (ANL-1), as compared to the negative electrode/electrolyte gassing from a similar cell but without the additive package. The additive effects in reducing pressure buildup are especially effective with the negative electrodes. The additives were also found to increase the activation energy and decrease the heat of reaction around the onset temperature that is believed to be the onset temperature for thermal runaway in the commercial lithium ion cells. The result of these studies indicate that these additives may be very effective in reducing gas buildup in high energy lithium-based cells for many different applications such as electric and hybrid vehicles, as well as in vivo applications such as for heart pacemakers and other implantable devices for the human body.

According to one embodiment of the invention, lithium electrochemical cell systems include:
  (i) A secondary Li-ion cell comprising a lithium metal oxide positive electrode, a negative electrode containing a crystalline carbon like graphite, an electrolyte composed of a lithium salt, and a blend of at least two aprotic solvents. The solvents include ethylene carbonate, dimethyl carbonate, ethyl methyl carbonate, propylene carbonate, or diethyl carbonate, and finally a compound that reduces cell gassing. The salts include $LiPF_6$, $LiBF_4$, $LiAsF_6$, and other salts currently being used or being developed such as the lithium bisoxlatoborate (LiBOB) salts.

(ii) A Li-ion secondary electrochemical cell similar to the cell type (i) described above except that the electrolyte is either a liquid gel or solid polymer with a dissolved salt such as $LiClO_4$, $LiPF_6$, $LiBF_4$, $LiAsF_6$, $LiCF_3SO_3$, $Li(CF_3SO_2)_2N$, $Li(CF_3SO_2)_3C$, $LiN(SO_2C_2F_5)_2$, lithium alkyl fluorophosphate, lithium bis(chelato)borates and mixtures thereof; or a solid polymer blended with the electrolyte described above in cell type (i), called a plasticized electrolyte. These electrolytes also contain a degassing agent.

(iii) A lithium-metal based primary or secondary electrochemical cell. This cell is similar to those described above except that they use lithium metal as the negative electrode, a metal oxide positive electrode such as $LiCoO_2$, $LiNiO_2$, $LiNi_{1-x}CoyMe_zO_2$, $LiMn_{0.5}Ni_{0.5}O_2$, $LiMn_{0.3}CO_{0.3}Ni_{0.3}O_2$, $LiFePO_4$, $LiMn_2O_4$, $LiFeO_2$, $LiMc_{0.5}Mn_{1.5}O_4$, vanadium oxide, and mixtures thereof, wherein Me is Al, Mg, Ti, B, Ga, or Si, and Mc is a divalent metal such as Fe, Co, Cu, Cr and Ni, and either a liquid electrolyte described in (i) liquid or solid polymer or plasticized electrolyte described in cell types (ii) above and that contains a degassing agent.

The agents or additives described herein include the following class of organic compounds; (a) $CH_2=R_1=CH_2$, where $R_1$ is an aliphatic carbon chain of 1 to 7 carbons, either linear or branched (b) $CH=R_1=CH$, (c) $CH_2=R_1$, (d) $CH=R_1$, (e) $R_2-C=R_1=CH2$, where $R_2$ is an aromatic (toluene or benzene), a cyclic hydrocarbon, a pyrrole, a piperazine, or a piperidine molecule, (f) $R_2-C=R_1=CH$, (g) $R_2-CH=R_1$, (h) $R_2-C=R_1$, (i) styrene carbonate, (j) aromatic carbonates, (k) vinyl pyrrole, (l) vinyl piperazine, (m) vinyl piperidine, (n) vinyl pyridine (o) triphenyl phosphate, (p) and blends thereof. These blends may involve other additives, such as vinyl ethylene carbonate, to protect against exfoliation in propylene carbonate based Li-ion electrolyte systems.

The agents or additives described herein can include, for example, 2,3 dimethyl-1,3 butadiene, 1,3 butadiene, is 2,3 dimethyl-1,4 pentadiene, 1,5 hexadiene, a blend of 2,3 dimethyl-1,3 butadiene and vinyl ethylene carbonate, and a blend of 2,3 dimethyl-1,4 pentadiene and vinyl pyridine. Other additives or agents include a blend of 1,5 hexadiene and piperazine, a blend of 2,3 dimethyl-1,3 butadiene and styrene, a blend of 2,3 dimethyl-1,3 butadiene and piperidine, a blend of hexadiene and vinyl pyridine, a blend of 2,3 dimethyl-1,3 butadiene and triphenyl phosphate, a blend of 2,3 dimethyl-1,3 butadiene and vinyl pyridine, styrene carbonate, and a blend of styrene carbonate and vinyl piperazine. Additionally, the additive or agent can also be a blend of two or more of the additives described above. According to one embodiment of the invention, the total concentration of additives ranges from 0.1 to 25 wt %, with an optimum concentration varying from 0.1 to 10 wt %.

It should be understood that the above description of the invention and the specific examples and embodiments therein, while indicating the preferred embodiments of the present invention, are given only by demonstration and not limitation. Many changes and modifications within the scope of the present invention may therefore be made without departing from the spirit of the invention, and the invention includes all such changes and modifications.

The invention claimed is:

1. A lithium based electrochemical cell system comprising:
a positive electrode comprising a lithium metal oxide;
a negative electrode comprising lithium metal;
an electrolyte selected from the group consisting of:
an electrolyte comprising a lithium salt, a first aprotic solvent; a second aprotic solvent and a degassing agent;
an electrolyte comprising a liquid gel, a lithium salt dissolved therein, and a degassing agent; and
an electrolyte comprising a solid polymer, a lithium salt dissolved therein, and a degassing agent
wherein:
the degassing agent comprises 2,3-dimethyl-1,3 butadiene; 1,3-butadiene; 2,3-dimethyl-1,4-pentadiene; or a compound represented by $CH=R_1=CH$, $CH_2=R_1$, $CH=R_1$, $R_2C=R_1=CH$, $R_2C=R_1$;
$R_1$ is an aliphatic carbon chain of 1 to 7 carbons; and
$R_2$ is an a cyclic hydrocarbon, an aromatic hydrocarbon, a pyrrole, a piperazine, or a piperidine.

2. The lithium based electrochemical cell system of claim 1, wherein the degassing agent comprises a compound having a formula selected from the group consisting of $CH=R_1=CH$, $CH_2=R_1$, and $CH=R_1$, wherein $R_1$ is an aliphatic carbon chain of 1 to 7 carbons.

3. The lithium based electrochemical cell system of claim 1, wherein the degassing agent comprises a compound or a blend of compounds having a formula selected from the group consisting of $R_2C=R_1=CH$, and $R_2C=R_1$, wherein $R_1$ is an aliphatic carbon chain of 1 to 7 carbons and wherein $R_2$ is a compound selected from the group consisting of a cyclic hydrocarbon, an aromatic hydrocarbon, a pyrrole, a piperazine, and a piperidine.

4. The lithium based electrochemical cell system of claim 1, wherein the degassing agent comprises a compound selected from the group consisting of 2,3-dimethyl-1,3 butadiene; 1,3-butadiene; and 2,3-dimethyl-1,4-pentadiene.

5. The lithium based electrochemical cell system of claim 1, wherein the degassing agent comprises a blend of 2,3-dimethyl-1,3-butadiene and vinyl ethylene carbonate.

6. The lithium based electrochemical cell system of claim 1, wherein the degassing agent comprises a blend of 2,3-dimethyl-1,4-pentadiene and vinyl pyridine.

7. The lithium based electrochemical cell system of claim 1, wherein the degassing agent comprises a blend of 2,3-dimethyl-1,3-butadiene and styrene.

8. The lithium based electrochemical cell system of claim 1, wherein the degassing agent comprises a blend of 2,3-dimethyl-1,3-butadiene and piperidine.

9. The lithium based electrochemical cell system of claim 1, wherein the degassing agent comprises a blend of 2,3-dimethyl-1,3-butadiene and triphenyl phosphate.

10. The lithium based electrochemical cell system of claim 1, wherein the degassing agent comprises a blend of 2,3-dimethyl-1,3-butadiene and vinyl pyridine.

11. The lithium based electrochemical cell system of claim 1, wherein the degassing agent comprises a blend of styrene carbonate and vinyl piperazine.

12. A rechargeable lithium ion cell comprising:
a positive electrode comprising a lithium metal oxide;
a negative electrode comprising a crystalline carbon;
an electrolyte comprising a lithium salt, a first aprotic solvent, and a second aprotic solvent; and
a degassing agent comprising 2,3-dimethyl-1,3 butadiene; 1,3-butadiene; 2,3-dimethyl-1,4-pentadiene; or a compound represented by $CH=R_1=CH$, $CH_2=R_1$, $R_2C=R_1=CH$, $R_2C=R_1$, wherein $R_1$ is an aliphatic carbon chain of 1 to 7 carbons, and $R_2$ is an a cyclic hydrocarbon, an aromatic hydrocarbon, a pyrrole, a piperazine, or a piperidine.

13. The rechargeable lithium ion cell of claim 12, wherein the first aprotic solvent and second aprotic solvent are selected from the group consisting of ethylene carbonate, dimethyl carbonate, ethyl methyl carbonate, propylene carbonate, and diethyl carbonate.

14. The rechargeable lithium ion cell of claim 12, wherein the degassing agent comprises a compound having a formula selected from the group consisting of $CH{=}R_1{=}CH$, $CH_2{=}R_1$, and $CH{=}R_1$, wherein $R_1$ is an aliphatic carbon chain of 1 to 7 carbons.

15. The rechargeable lithium ion cell of claim 12, wherein the degassing agent comprises a compound or a blend of compounds having a formula selected from the group consisting of $R_2C{=}R_1{=}CH$, and $R_2C{=}R_1$, wherein $R_1$ is an aliphatic carbon chain of 1 to 7 carbons and wherein $R_2$ is a compound selected from the group consisting of a cyclic hydrocarbon, an aromatic hydrocarbon, a pyrrole, a piperazine, and a piperidine.

16. A rechargeable lithium ion cell comprising:
   a positive electrode comprising a lithium metal oxide;
   a negative electrode comprising a crystalline carbon;
   an electrolyte selected from the group consisting of:
      an electrolyte comprising a liquid gel, a lithium salt dissolved therein, and a degassing agent;
      an electrolyte comprising a solid polymer, a lithium salt dissolved therein, and a degassing agent; and
      an electrolyte comprising a solid polymer blended with a lithium salt dissolved in a first aprotic solvent and a second aprotic solvent, and a degassing agent
   wherein:
      the degassing agent comprises 2,3-dimethyl-1,3 butadiene; 1,3-butadiene; 2,3-dimethyl-1,4-pentadiene; or a compound represented by $CH{=}R_1{=}CH$, $CH_2{=}R_1$, $CH{=}R_1$, $R_2C{=}R_1{=}CH$, $R_2C{=}R_1$;
      $R_1$ is an aliphatic carbon chain of 1 to 7 carbons; and
      $R_2$ is a cyclic hydrocarbon, an aromatic hydrocarbon, a pyrrole, a piperazine, or a piperidine.

17. The rechargeable lithium ion cell of claim 16, wherein the degassing agent comprises a compound having a formula selected from the group consisting of $CH{=}R_1{=}CH$, $CH_2{=}R_1$, and $CH{=}R_1$, wherein $R_1$ is an aliphatic carbon chain of 1 to 7 carbons.

18. The rechargeable lithium ion cell of claim 16, wherein the degassing agent comprises a compound or a blend of compounds having a formula selected from the group consisting of $R_2C{=}R_1{=}CH$, and $R_2C{=}R_1$, wherein $R_1$ is an aliphatic carbon chain of 1 to 7 carbons and wherein $R_2$ is a compound selected from the group consisting of a cyclic hydrocarbon, an aromatic hydrocarbon, a pyrrole, a piperazine, and a piperidine.

* * * * *

UNITED STATES PATENT AND TRADEMARK OFFICE
CERTIFICATE OF CORRECTION

| | |
|---|---|
| PATENT NO. | : 8,168,325 B2 |
| APPLICATION NO. | : 11/943462 |
| DATED | : May 1, 2012 |
| INVENTOR(S) | : Yoo-Eup Hyung, Donald R. Vissers and Khalil Amine |

It is certified that error appears in the above-identified patent and that said Letters Patent is hereby corrected as shown below:

In the Claims

In Column 4, Claim 12, Line 67, remove "$R_2C=R_1=CH$" and replace it with -- $CH=R_1$, -- followed by $R_2C=R_1$.

Signed and Sealed this
First Day of October, 2013

Teresa Stanek Rea
*Deputy Director of the United States Patent and Trademark Office*